United States Patent
Zeng et al.

(10) Patent No.: US 11,966,381 B2
(45) Date of Patent: Apr. 23, 2024

(54) EVENT DRIVEN DATA HEALTH MONITORING

(71) Applicant: Microsoft Technology Licensing, LLC, Redmond, WA (US)

(72) Inventors: Liangzhao Zeng, Cupertino, CA (US); Ting Yu Cliff Leung, San Jose, CA (US); Yat On Lau, San Jose, CA (US); Jimmy Hong, Belmont, CA (US); Chuang Yao, Sunnyvale, CA (US); Yen-Ting Liu, Milpitas, CA (US); Ting-Kuan Wu, Cupertino, CA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 226 days.

(21) Appl. No.: 17/454,232

(22) Filed: Nov. 9, 2021

(65) Prior Publication Data
US 2023/0147939 A1  May 11, 2023

(51) Int. Cl.
*G06F 16/23* (2019.01)
(52) U.S. Cl.
CPC ...... *G06F 16/2365* (2019.01); *G06F 16/2379* (2019.01)
(58) Field of Classification Search
None
See application file for complete search history.

(56) References Cited

U.S. PATENT DOCUMENTS

| | | |
|---|---|---|
| 9,720,746 B2 | 8/2017 | Zhu |
| 10,984,128 B1 | 4/2021 | Hoffer |
| 11,204,851 B1 * | 12/2021 | Iyengar ............... G06F 11/3006 |
| 2002/0046072 A1 | 4/2002 | Arai |
| 2007/0067373 A1 | 3/2007 | Higgins |
| 2007/0150329 A1 | 6/2007 | Brook |
| 2009/0172669 A1 | 7/2009 | Bobak |
| 2010/0125450 A1 | 5/2010 | Michaelangelo |
| 2011/0082712 A1 | 4/2011 | Eberhardt et al. |
| 2012/0192143 A1 | 7/2012 | Elaasar |

(Continued)

OTHER PUBLICATIONS

Xenonstack, "Data Ingestion, Processing and Big Data Architecture Layers", Medium.com blog post dated Mar. 2, 2017, 28 pages. (Year: 2017).*

(Continued)

*Primary Examiner* — Scott A. Waldron
(74) *Attorney, Agent, or Firm* — Nicholson De Vos Webster & Elliott LLP

(57) ABSTRACT

Embodiments maintain a data pool that includes heterogeneous data sets, and receiving a first data batch of a data set from a data source into the data pool. Embodiments determine a current state of the data set based on a data set state diagram including a plurality of data set states, and identify a condition of the first data batch. Embodiments further set a data batch state for the first data batch, based on a data batch state diagram, and update the data batch state of a prior data batch received before the first data batch, based on the condition of the first data batch. Embodiments additionally transition the data set state diagram, based on the condition of the first data batch, to an updated data set state. Embodiments maintain a data state repository storing the data set state for each of the plurality of heterogeneous data sets.

20 Claims, 10 Drawing Sheets

(56) References Cited

U.S. PATENT DOCUMENTS

| | | |
|---|---|---|
| 2014/0208296 A1 | 7/2014 | Dang |
| 2017/0017705 A1 | 1/2017 | Nelke |
| 2017/0046484 A1 | 2/2017 | Buckler et al. |
| 2019/0026634 A1 | 1/2019 | Homeyer |
| 2019/0026663 A1 | 1/2019 | Homeyer |
| 2019/0318283 A1 | 10/2019 | Kelly |
| 2020/0125448 A1 | 4/2020 | von Trapp |
| 2020/0210391 A1 | 7/2020 | Scott |
| 2021/0064645 A1 | 3/2021 | Ferreira |
| 2021/0248144 A1* | 8/2021 | Haile ........................ G06N 5/04 |
| 2021/0397522 A1 | 12/2021 | Owen |
| 2022/0043826 A1 | 2/2022 | Zorin |
| 2022/0108262 A1 | 4/2022 | Cella |
| 2022/0228102 A1 | 7/2022 | Le et al. |
| 2023/0145069 A1 | 5/2023 | Zeng et al. |
| 2023/0206181 A1 | 6/2023 | Stone |

OTHER PUBLICATIONS

Zeng, Liangzhao, "Towards Data Quality Management at LinkedIn", LinkedIn Engineering blog posted dated Jun. 9, 2022, 5 pages. (Year: 2022).*

"Non-Final Office Action Issued in U.S. Appl. No. 17/454,229", dated Mar. 16, 2023, 16 Pages.

"Notice of Allowance Issued in U.S. Appl. No. 17/454,229", dated Oct. 17, 2023, 5 Pages.

"Notice of Allowance Issued in U.S. Appl. No. 17/454,229", Mailed Date: Jul. 28, 2023, 14 Pages.

Non-Final Office Action mailed on Dec. 21, 2023, in U.S. Appl. No. 17/664,655, 13 pages.

\* cited by examiner

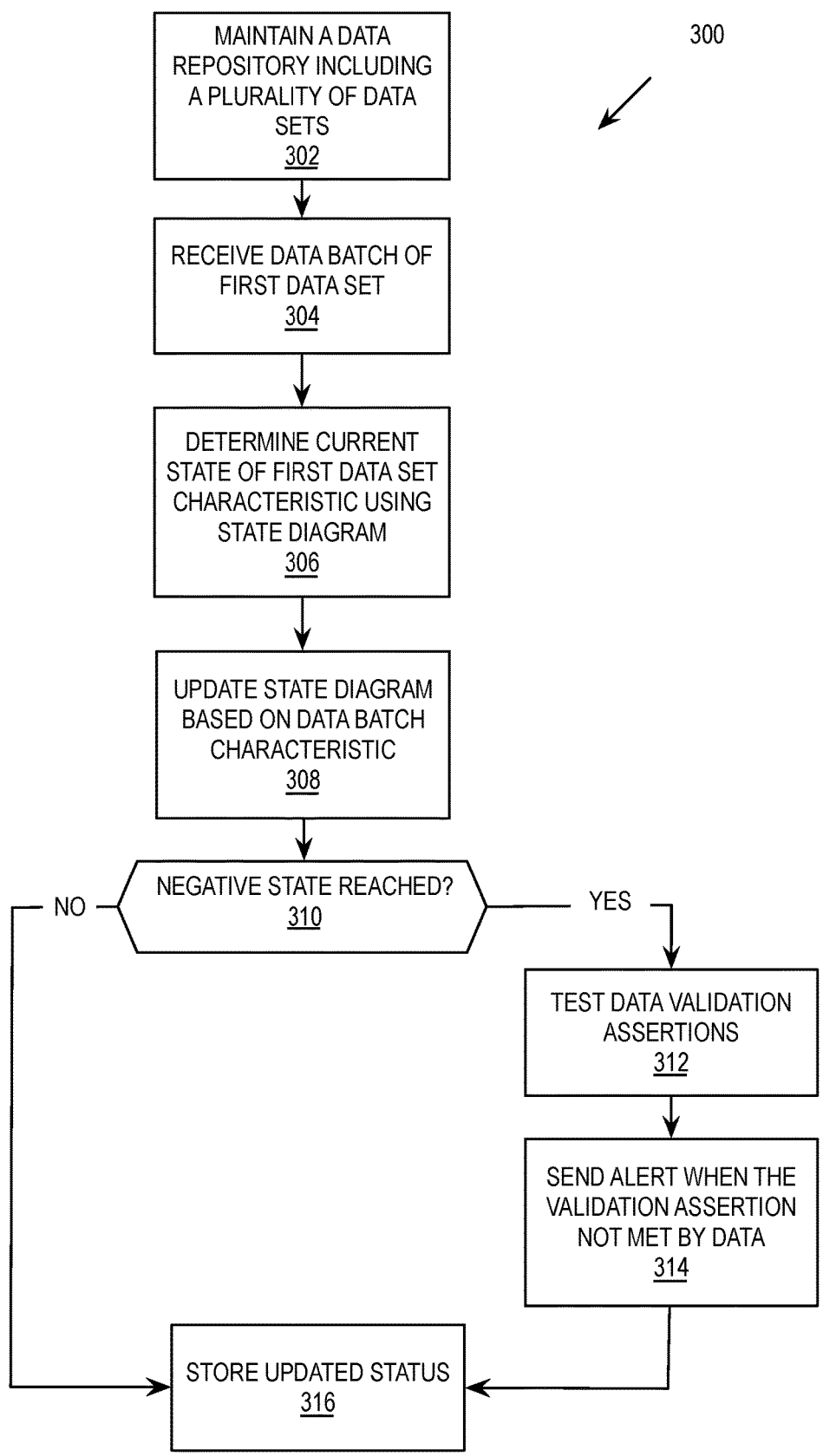

EVENT DRIVEN DATA HEALTH MONITORING

TECHNICAL FIELD

The present disclosure generally relates to data health, and more specifically, relates to creating event-driven data health monitoring.

BACKGROUND ART

Data health can refer to the status and/or quality of data stored in a data repository. Data health management can refer to software tools for managing data health in a repository.

BRIEF DESCRIPTION OF THE DRAWINGS

The disclosure will be understood more fully from the detailed description given below and from the accompanying drawings of various embodiments of the disclosure. The drawings, however, should not be taken to limit the disclosure to the specific embodiments, but are for explanation and understanding only.

FIG. 3 is a flow diagram of an example method 300 to provide state diagram-based data health monitoring in accordance with some embodiments of the present disclosure.

DETAILED DESCRIPTION

Figure 1:
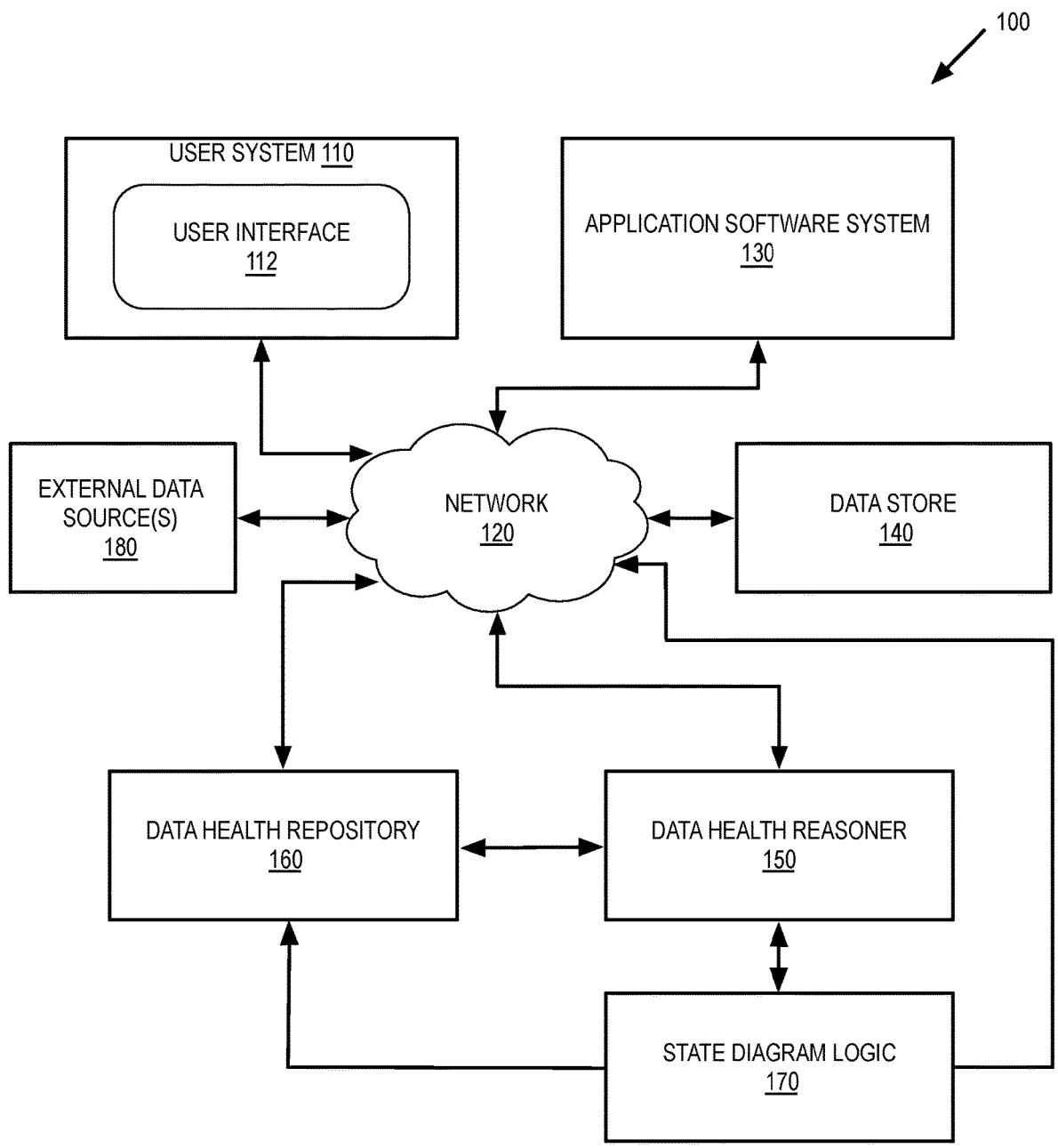
FIG. 1 illustrates an example computing system 100 that includes a data health reasoner 150 in accordance with some embodiments of the present disclosure.

In other systems, data health management is accomplished using low level programming, which requires information technology (IT) and programming skills to implement. Other approaches may provide some text description about data health, but do not enable any enforcement of data health standards.

Aspects of the present disclosure are directed to event-driven data health management utilizing state diagrams to maintain and update the status of data sets in a data repository. In other systems, applying rules to validate data health require scanning all the data health metrics and conditions. Furthermore, setting alerts requires scanning to identify data batches that violate the alert settings. Both of these results in system overhead and additional alert latency. Other systems do not maintain state data for data batches or data sets, but rather apply validation rules to individual data batches. Furthermore, the prior art systems require complex calculations for any alerts that rely on data from multiple data batches.

Aspects of the present disclosure address the above and other deficiencies by providing a system for event driven data health reasoning, which utilizes state diagrams to determine a current state of each data set, and to provide a visual representation of that current state. In one embodiment, the state diagrams can be used to provide context to changes in status, enabling a user to see how the status changes over time. In one embodiment, a user interface may provide the ability to replay changes in the state diagram over time, to review data set changes.

A collection of data received from a data source is referred to as a data set. A data set shares the same characteristics, or data metrics. A data set consists of multiple data batches, received over time. Each batch of data received for a data set is referred to as a data batch. The data batch is a data partition or data version. When the data batch is only part of a dataset then it is defined as data set partition. When the data batch is a complete set of data, then it is defined as a version of data set. In one embodiment, the system maintains metadata for each data batch, as well as for the data set. In one embodiment, the system maintains a data set state diagram, as well as a state diagram for each individual data batch that makes up the data set. In some embodiments, the state diagrams may be made available as a visual representation of the data's status. In another embodiment, only the current status of a data batch and/or data set is provided to the user, and the state diagram provides the logic to determine the status, but is not data that is visually presented. In one embodiment, the user may drill down to look at the context of the current state. Because the changes in the state diagram are tracked, they provide the context of the current state. This enables the present system to provide contextual information, in one embodiment. The context may be presented visually or in text, in one embodiment.

Data health metrics are the measured characteristics of the data, which can include data schema, size, frequency, arrival time, and other characteristics of the expected data batches for a particular data set. The data health rules, also referred to as data validation assertions, are the characteristics that must be met by each data batch for a particular data set. The data health management events can include alerts to systems using the data, when one or more of the data validation assertions are not met. In some embodiments, the data health management events can trigger automatic actions, such as the exclusion of a data set from a particular calculation. The disclosed technologies in one embodiment further provide the ability to define custom data health triggers for users, such that users receive notifications when one or more of the data health conditions are not met by data that they use. The disclosed technologies, in one embodiment, additionally enable the data providers to perform pre-tests to determine whether any proposed changes to characteristics of data provided by the data providers would trigger any custom-defined data health conditions.

FIG. 1 illustrates an example computing system 100 that includes a data health reasoner 150 in accordance with some embodiments of the present disclosure.

In the embodiment of FIG. 1, computing system 100 includes a user system 110, a network 120, an application software system 130, a data store 140, a data health reasoner 150, a data health repository 160, and a state diagram logic 170.

User system 110 includes at least one computing device, such as a personal computing device, a server, a mobile computing device, or a smart appliance. User system 110 includes at least one software application, including a user interface 112, installed on or accessible by a network to a computing device. For example, user interface 112 can be or include a front-end portion of application software system 130.

For simplicity, the present application will use as an example a social application system. Social application systems include but are not limited to connections network software, such as professional and/or general social media platforms, and systems that are or are not be based on connections network software, such as digital content distribution services, general-purpose search engines, job search software, recruiter search software, sales assistance software, advertising software, learning and education software, or any combination of any of the foregoing. However, the present system can be used with any application, which utilizes large data sets.

User interface 112 is any type of user interface as described above. User interface 112 can be used to input search queries and view or otherwise perceive output that includes data produced by application software system 130. For example, user interface 112 can include a graphical user interface and/or a conversational voice/speech interface that includes a mechanism for entering a search query and viewing query results and/or other digital content. Examples of user interface 112 include web browsers, command line interfaces, and mobile apps. User interface 112 as used herein can include application programming interfaces (APIs).

Data store 140 is a data repository. Data store 140 stores a plurality of heterogeneous data sets, each data set including a plurality of data batches, received from external data sources 180. Heterogeneous data sets include data sets that have different content, schemas, delivery frequencies, and times, and/or other differentiators. The data sets can be from different providers, e.g., various third parties.

The data is received from external data sources 180. In one embodiment, the data is received by the data store 140, via an interface. The data is considered external, in one embodiment, when it originates outside the data store 140. The data can be provided by other systems within the same company, or by processes running on the computing system 100. In the social application system example provided, the external data sources 180 for example can include data sources of information about user social connections, data sources of information indicating user posts on the social application, data sources that collect user interactions on third party websites, such as media sites that are affiliated with the social application system. Some of these data sets are generated by the social application. However, they would still be considered external data sources 180 because they are not generated by the data repository management system of computer system 100. The data sets provided as examples are heterogeneous because they are provided on a different schedule, for different data, with different data schemas. However, any one of those differentiators is sufficient to consider data sets heterogenous.

In one embodiment, there can be different external data sources 180 which provide different types, quantities, and frequencies of data to the data store 140. Data store 140 can reside on at least one persistent and/or volatile storage device that can reside within the same local network as at least one other device of computing system 100 and/or in a network that is remote relative to at least one other device of computing system 100. Thus, although depicted as being included in computing system 100, portions of data store 140 can be part of computing system 100 or accessed by computing system 100 over a network, such as network 120.

Application software system 130 is any type of application software system that includes or utilizes functionality provided by the data health reasoner 150. Examples of application software system 130 include but are not limited to connections network software, such as social media platforms, and systems that are or are not be based on connections network software, such as general-purpose search engines, job search software, recruiter search software, sales assistance software, advertising software, learning and education software, or any combination of any of the foregoing. The application software system 130 can include a system that provides data to network software such as social media platforms or systems.

While not specifically shown, it should be understood that any of user system 110, application software system 130, data store 140, data health reasoner 150, data health repository 160, and state diagram logic 170 includes an interface embodied as computer programming code stored in computer memory that when executed causes a computing device to enable bidirectional communication with any other of user system 110, application software system 130, data store 140, data health reasoner 150, data health repository 160, and state diagram logic 170 using a communicative coupling mechanism. Examples of communicative coupling mechanisms include network interfaces, inter-process communication (IPC) interfaces and application program interfaces (APIs).

A client portion of application software system 130 can operate in user system 110, for example as a plugin or widget in a graphical user interface of a software application or as a web browser executing user interface 112. In an embodiment, a web browser can transmit an HTTP request over a network (e.g., the Internet) in response to user input that is received through a user interface provided by the web application and displayed through the web browser. A server running application software system 130 and/or a server portion of application software system 130 can receive the input, perform at least one operation using the input, and return output using an HTTP response that the web browser receives and processes.

Each of user system 110, application software system 130, data store 140, data health reasoner 150, data health repository 160, and state diagram logic 170 are implemented using at least one computing device that is communicatively coupled to electronic communications network 120. Any of user system 110, application software system 130, data store 140, data health reasoner 150, data health repository 160, and state diagram logic 170 can be bidirectionally communicatively coupled by network 120, in some embodiments. User system 110 as well as one or more different user systems (not shown) can be bidirectionally communicatively coupled to application software system 130.

A typical user of user system 110 can be an administrator or end user of application software system 130, data health reasoner 150, data health repository 160, and state diagram logic 170. User system 110 is configured to communicate bidirectionally with any of application software system 130, data store 140, data health reasoner 150, data health repository 160, and state diagram logic 170 over network 120, in one embodiment. In another embodiment, the user system 110 communicates with application software system 130 and data health reasoner 150, but does not directly communicate with the data health repository 160 and/or state diagram logic 170. In some embodiments, the state diagram logic 170 is part of the data health reasoner 150. In another embodiment, the state diagram logic 170 is coupled to the data health reasoner 150 and data health repository 160, but is not coupled to the network 120, and thus to user system 110 or application software system 130.

The features and functionality of user system 110, application software system 130, data store 140, data health reasoner 150, data health repository 160, and state diagram logic 170 are implemented using computer software, hardware, or software and hardware, and can include combinations of automated functionality, data structures, and digital data, which are represented schematically in the figures. User system 110, application software system 130, data store 140, data health reasoner 150, data health repository 160, and state diagram logic 170 are shown as separate elements in FIG. 1 for ease of discussion but the illustration is not meant to imply that separation of these elements is required. The illustrated systems, services, and data stores (or their functionality) can be divided over any number of physical systems, including a single physical computer system, and can communicate with each other in any appropriate manner.

Network 120 can be implemented on any medium or mechanism that provides for the exchange of data, signals, and/or instructions between the various components of computing system 100. Examples of network 120 include, without limitation, a Local Area Network (LAN), a Wide Area Network (WAN), an Ethernet network or the Internet, or at least one terrestrial, satellite or wireless link, or a combination of any number of different networks and/or communication links, as well as wired networks, or computer busses when the system 100 is implemented on a single computer system. Network 120 can be considered a variety of different networks, for connecting the different parts of computing system 100, including wired connections. The various elements can be connected with different networks and/or types of networks.

Figure 9:
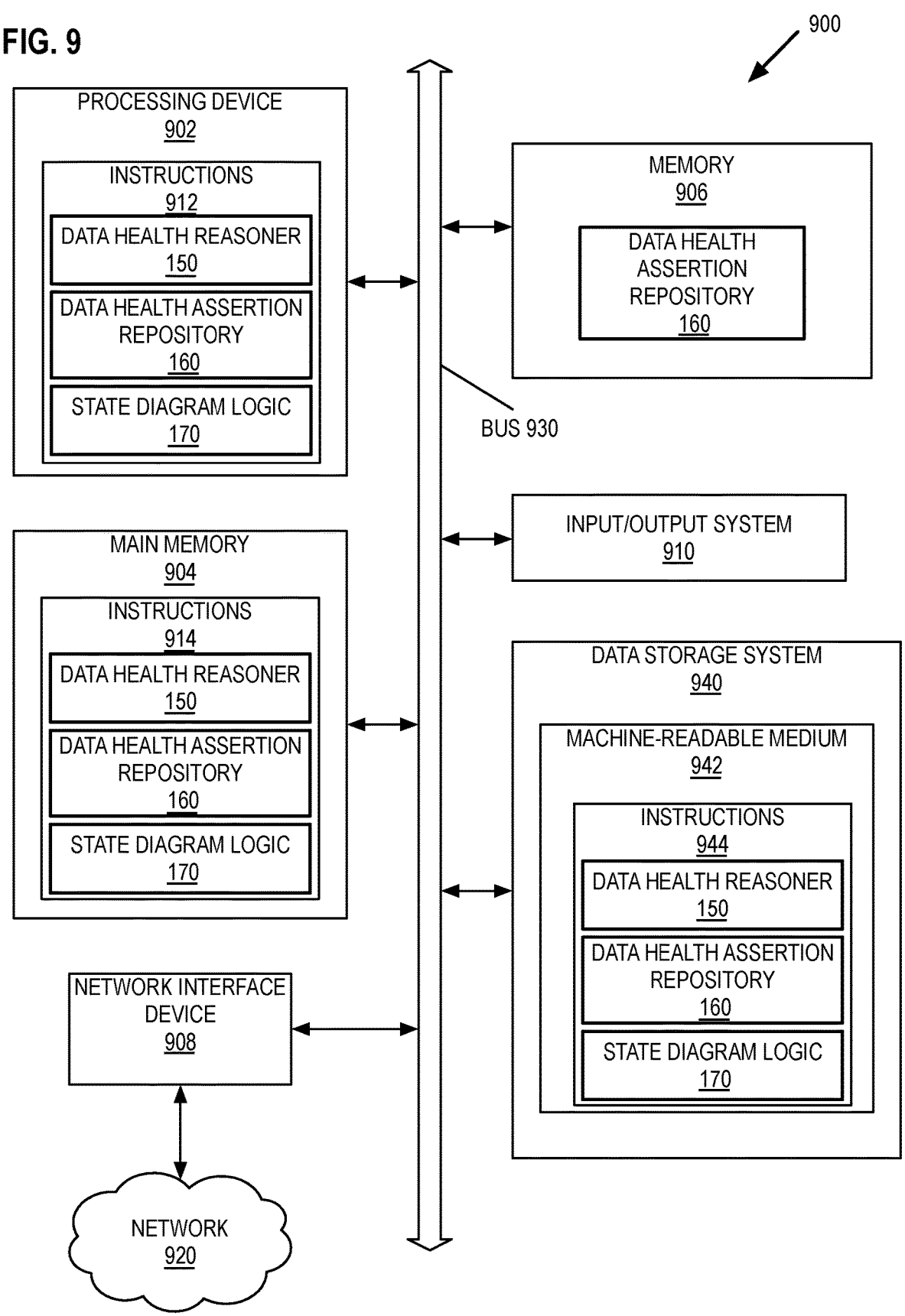
FIG. 9 is a block diagram of an example computer system in which embodiments of the present disclosure can operate.

The computing system 100 includes a data health reasoner component 150 that can evaluate the data health of data from external data sources 180, a data health repository 160 which can be queried by user systems 110 associated with data consumers, and a state diagram logic 170 which may provide data to user systems 110, through data health reasoner 150, application software system 130, or directly. In some embodiments, the application software system 130 includes at least a portion of the data health reasoner 150. As shown in FIG. 9, the data health reasoner 150 can be implemented as instructions stored in a memory, and a processing device 902 can be configured to execute the instructions stored in the memory to perform the operations described herein.

The data health reasoner 150 in one embodiment automatically creates data validation assertions for heterogeneous data sets, and applies those data validation assertions to verify the quality of new data in the data store 140. In one embodiment, the data health reasoner 150 uses state diagram logic 170 to determine the status of the data set and new data batch in the data store 140. State diagram logic 170 utilizes data about the new data batch to update the state diagram for the data set and/or data batch.

The state diagram is used to track the status of one or more characteristics of the data set, as represented by a finite number of states and a set of possible events which move the status of the data set between the possible states. From each state, any possible event will move the state diagram to a single other state, enabling the state diagram to be used to track the different states of the data set characteristic through all possible events and states. In one embodiment, the state diagram logic 170 tracks both the states of the data set, and the states of individual data batches in the data set. In one embodiment, the state diagram logic 170 tracks the on-time arrival status of data. In one embodiment, the state diagram logic tracks other characteristics of the data. In one embodiment, one or more characteristics can be tracked via state diagram logic. Thus, a single data set may have one or more state diagrams associated with it.

The data health repository 160 stores the metadata created by the data health reasoner 150. In one embodiment, the data health repository 160 also stores the state information generated by state diagram logic 170. The disclosed technologies can be described with reference to the large number of types of data utilized in a social graph application such as a professional social network application. The disclosed technologies are not limited to data associated with social graph applications but can be used to perform data quality validation more generally. The disclosed technologies can be used by many different types of network-based applications that consume large heterogeneous data sets. For example, any predictive system which receives large volumes of different types of data which change over time, could take advantage of such a system. The data health repository 160 stores the metadata generated by the data health reasoner 150.

Further details with regards to the operations of the data health reasoner 150, the data health repository 160, and the state diagram logic 170 are described below.

Figure 2:
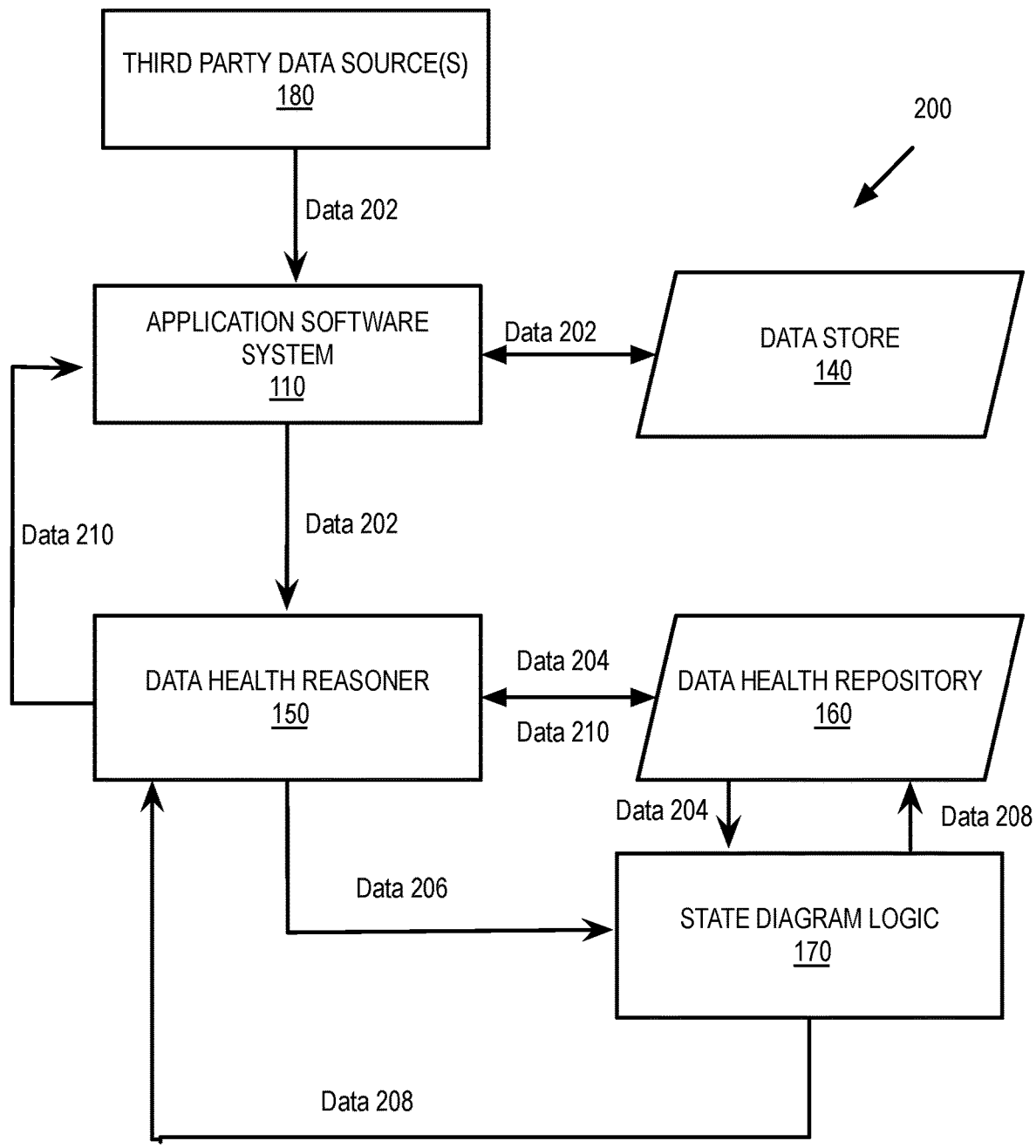
FIG. 2 is a flow diagram of an example method 200 to provide data health reasoning in accordance with some embodiments of the present disclosure.

FIG. 2 is a data flow diagram of an example method 200 to provide data health reasoning in accordance with some embodiments of the present disclosure. The external data sources 180 can be any data source, internal or external to the system that provides data 202 to data store 140. In one embodiment, the external data source 180 provides data 202 to application software system 130, to process the data into data store 140. The data 202 is additionally provided to the data health reasoner 150.

In one embodiment, the data health reasoner 150 utilizes multiple batches of data 202 in a data set to identify the data characteristics, based on a meta-model which represents the possible characteristics for a data set. A meta-model is a schema representing a collection of existing metrics, one or more of which apply to any data set. The metamodel provides a formal language that enables semantic description of data health and data validation assertions. In one embodiment, the metamodel is human readable, as well as computer parseable. The metamodel can be implemented using XML.

The measured values of these characteristics are used to formulate data health metrics for the data set. The system utilizes the collected data about the data set to determine which subset of the data characteristics applies to the data set. In one embodiment, the system uses a statistical analysis of multiple data batches in the data set to determine the data characteristics. In one embodiment, a machine learning system can be used to derive the data characteristics. Once these characteristics are identified, the system derives the data health metrics for the data. In one embodiment, the system includes a set of predefined characteristics, defined by the metamodel, and compares the actual characteristics of the data batches received in the data set to those predefined characteristics. For example, a characteristic may be "time of arrival." The system observes the actual time of arrival of the data batches, and based on that observation determines the data health metrics for the data model.

In one embodiment, the system initially sets the data health metrics based on the observed conditions of the first data batch. As subsequent data batches are received the values are refined. In one embodiment, the system continuously refines these values. In one embodiment, the system collects data over multiple data batches before defining the initial values. In one embodiment, the initial values are defined after three data batches have been received. In another embodiment, the initial values are defined after the first data batch is received. In one embodiment, the system may use a standard statistical model to exclude outliers. In one embodiment, data which is more than two standard deviations outside the expected value range is dropped as outlying data.

In one embodiment, the metamodel provides the ability to define additional characteristics for data sets, beyond the predefined characteristics. In one embodiment, such added characteristics may be based on existing characteristics, in which case it may be applied to existing data batches in the data set. In another embodiment, such added characteristics may be new data, in which case the above process of generating the data health metrics based on the observed characteristics is used. For example, a new characteristic may be the presence of absence of a particular field, the use of Unicode characters, or any other aspect of that data which can be checked and stored as metadata.

The data health metrics are the consistent characteristics that must be met by each data batch. The data health metrics describe the format, frequency, size, and other characteristics of the data set. For example, the data health metrics for a data set can be that the data is partitioned, have a defined data scheme, be provided daily and available no later than 9 am in the morning for each day. These data health metrics can be stored as data 204 in data health repository 160.

The data health reasoner 150 monitors subsequent data batches of the data set to determine whether they meet the data health metrics. In one embodiment, each data batch has one or more state diagrams, maintained by state diagram logic 170, representing its current state. When a new data batch is received the state diagram logic 170 utilizes the data 204 from data health repository 160, and the data 206 from data health reasoner 150, and updates the state of the data set. In one embodiment, the state diagram logic 170 also updates the state diagram of the new data batch and the state of prior data batch(es). The end state of the data batch and data set, data 208, is returned to data health reasoner 150. Data health reasoner 150 uses this data to verify that the new data batch meets the data health metrics.

In one embodiment, each of the health metrics are maintained by state diagram logic 170. In one embodiment, some metrics which have a very limited number of possible states may not use a state machine. The state machine is automatically established based on the data health metrics associated with the data batch and data set. The use of the state machine makes the maintenance of the data state and the check-in of data for new data batches very simple. The state machine provides the current status, and the transition to the next status is defined based on the metadata. It also provides a simple visualization of the status of the data set and data state, and a context of the status. The data health metrics can verify whether the data is partitioned, matches the defined data scheme, and was received by the expected arrival time. In one embodiment, the on-arrival time of the data set is maintained using the state diagram logic 170.

The measured data health metrics for the data batch are metadata that can be stored as data 210 in data health repository 160. When the data health reasoner 150 indicates that a particular data batch does not meet the data health metrics, the data health reasoner 150 can send an alert, data 210, via application software system 130. As will be described below, the systems that utilize the data can customize their preferred metrics for alerts. For example, a data consuming application that access the data at 10 am may wish to be alerted only when the data expected at 9 am doesn't arrive by 9:45 am, since the 45 minute delay does not impact their use. Thus, the user can set up a custom alert, based on their own needs. This reduces the unnecessary warnings and alerts.

The alert can be used by data consuming applications and/or users to determine whether to use the data from data store 140. For example, for some uses, if the current data is missing (e.g., a data batch expected is not received) the user may choose to exclude the data, or use a prior data batch in their processing. For some uses, the user may delay the processing until the data becomes available. If the current data batch has a different schema, this can make the data unusable for some systems. Thus, the user may choose to exclude the data from their processing, or verify that the schema change does not impact their use. Other options for addressing unavailable or unusable data can be chosen. By having this information, the user or system that consumes the data can affirmatively choose how to react. In this way, the system automatically generates and provides data health information to users of the data simplifying data processing and reducing wasted processing of out-of-date data.

FIG. 3 is a flow diagram of an example method 300 to provide data health reasoning in accordance with some embodiments of the present disclosure.

At operation 302, a data repository is maintained. The data repository includes a plurality of data batches, making up a data set. The data repository in one embodiment maintains a plurality of heterogeneous data sets. Each of the data sets has associated data health metrics, which are derived automatically based on a meta-model. The data health metrics define the characteristics of the data set, for example frequency, time of arrival, schema, etc. Once the data health metrics are defined, in one embodiment, a state diagram is automatically generated for one or more of the data health metrics.

At operation 304, a new data batch for a first data set is received. The new data batch has a number of characteristics, like partitioning status, schema, size, time, and date of arrival, etc.

At operation 306, the current state of a characteristic is identified, based on the state diagram of the data set characteristic. In one embodiment, if this is the first data set, the "initial" state is selected. Otherwise, the prior determined state is identified. Each state diagram reflects the current status of one characteristic, in one embodiment. At this operation, in one embodiment, each of the characteristics associated with a state diagram are evaluated.

At operation 308, the state diagram is updated based on a condition of the data batch. The event moves the state from the current state, identified at operation 306, to the new state. From any starting state, any possible event or characteristic, will move the state diagram to a single new state. That is, the states of the state diagram are exclusive, no potential characteristic of the new data batch would result in different states, when starting from the same state. In some embodiments, when multiple characteristics are represented by state diagrams, the system performs this process, operations 306 and 308, for each such characteristic. In one embodiment, the process further identifies any data health characteristics that aren't maintained using a state diagram, and determines their state.

At operation 310, the process determines whether a negative state was reached for any of the state diagrams representing data health characteristics. A negative state indicates that the data batch and/or data set are not complete and received as expected in the appropriate format. If no negative states are reached, the updated status is stored, at operation 316. If one or more data set characteristics are negative, the process continues to block 312.

At operation 312, the data health reasoner applies the data validation assertions to the data batch. That is, the system determines whether the new data batch meets all of the data validation assertions for the data set. The data health reasoner uses the updated state of the characteristic, when applicable.

In one embodiment, the data health reasoner stores the result of the testing in the data health repository as metadata associated with the data batch. In one embodiment, the data health reasoner also updates the metadata associated with the data set, based on the data batch evaluation results. In one embodiment, the data set status indicates the results of the applied data validation assertions against the latest data batch.

At operation 314, an alert is generated if one or more of the data validation assertions are not met by the data batch. The alert can be sent via a user interface. The alert can be a signal associated with the data. The alert can be an email. Other ways of providing the alert can be used. In one embodiment, the alert can be received by an automatic system that utilizes the data set. The process then stores the updated status, at operation 316. This method 300 is used continuously as new data batches are added to the repository. In one embodiment, the method 300 continuously monitors new data batches added to the data repository, and applies the data validation assertions against new data batches. In another embodiment, the data repository can notify the method 300 that a new data batch is received, and trigger the application of the data validation assertions.

The use of the state diagram provides a rapid way to update information about a data set, as well as a provide a visual representation of the current state of the data set and/or data batch. In one embodiment, as will be discussed below, the state diagram also provides context to the current data set and data batch state. In one embodiment, the system may provide the ability to replay the state changes in the state diagram, to review changes to a data set and/or data batch state over time.

The methods described above can be automatically performed by processing logic that can include hardware (e.g., processing device, circuitry, dedicated logic, programmable logic, microcode, hardware of a device, integrated circuit, etc.), software (e.g., instructions run or executed on a processing device), or a combination thereof. In some embodiments, one or more of the methods above are performed by the data health reasoner component 150 of FIG. 1. Although shown in a particular sequence or order, unless otherwise specified, the order of the processes can be modified. Thus, the illustrated embodiments should be understood only as examples, and the illustrated processes can be performed in a different order, and some processes can be performed in parallel. Additionally, one or more processes can be omitted in various embodiments. Thus, not all processes are required in every embodiment. Other process flows are possible.

Figure 4A:
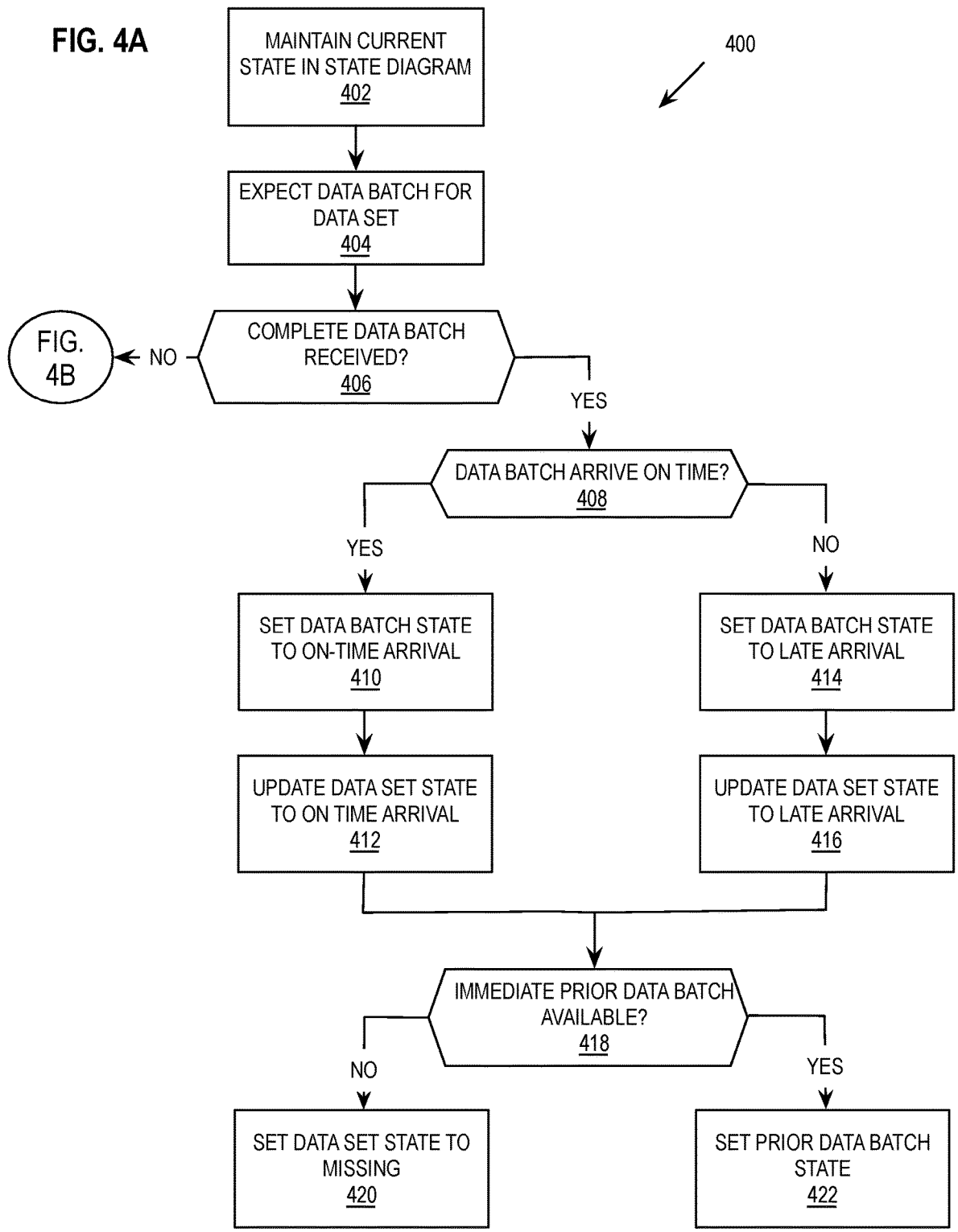
FIG. 4A and FIG. 4B are a flow diagram of an example method 400 to using a state diagram for data health reasoning in accordance with some embodiments of the present disclosure.
Figure 4B:
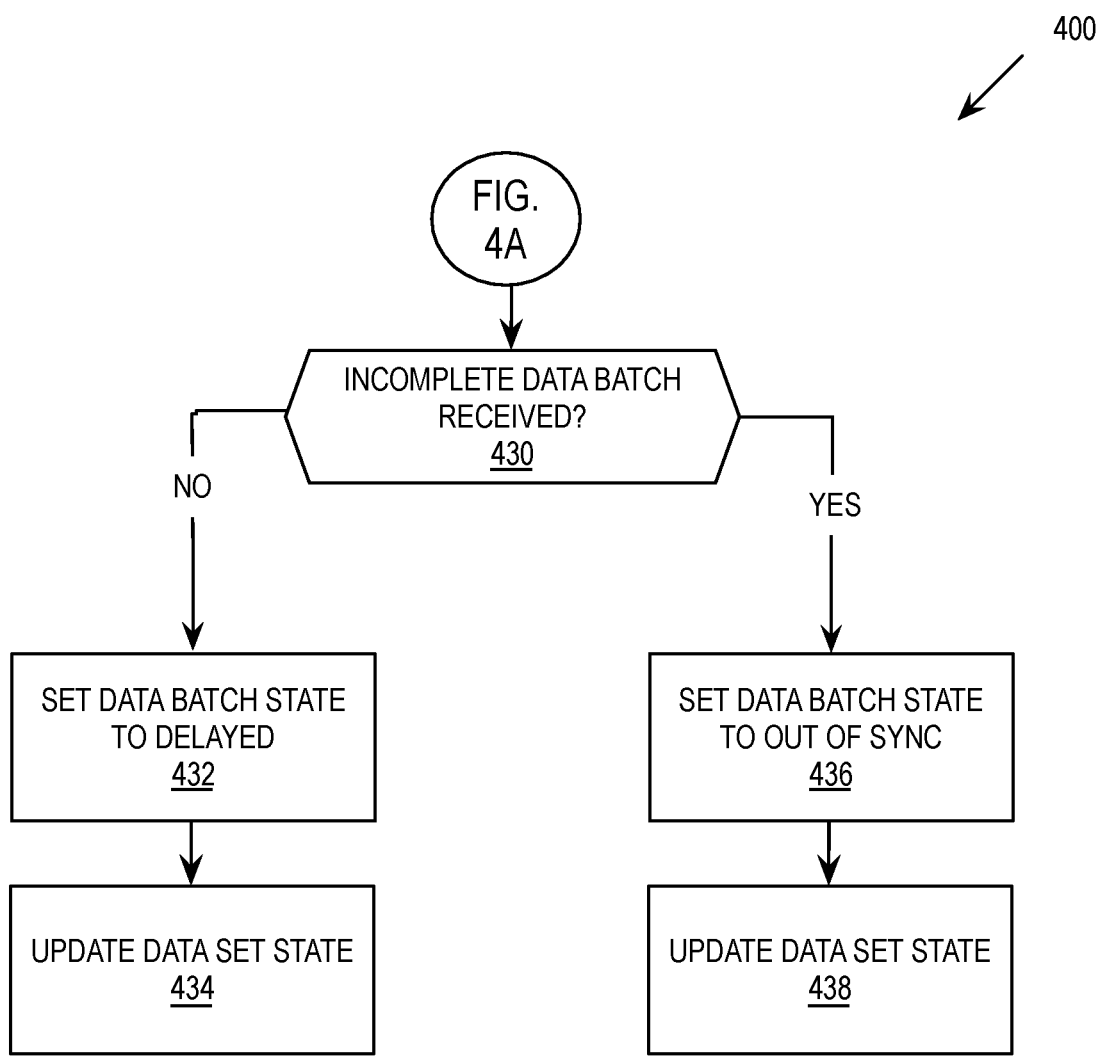
Figure 5:
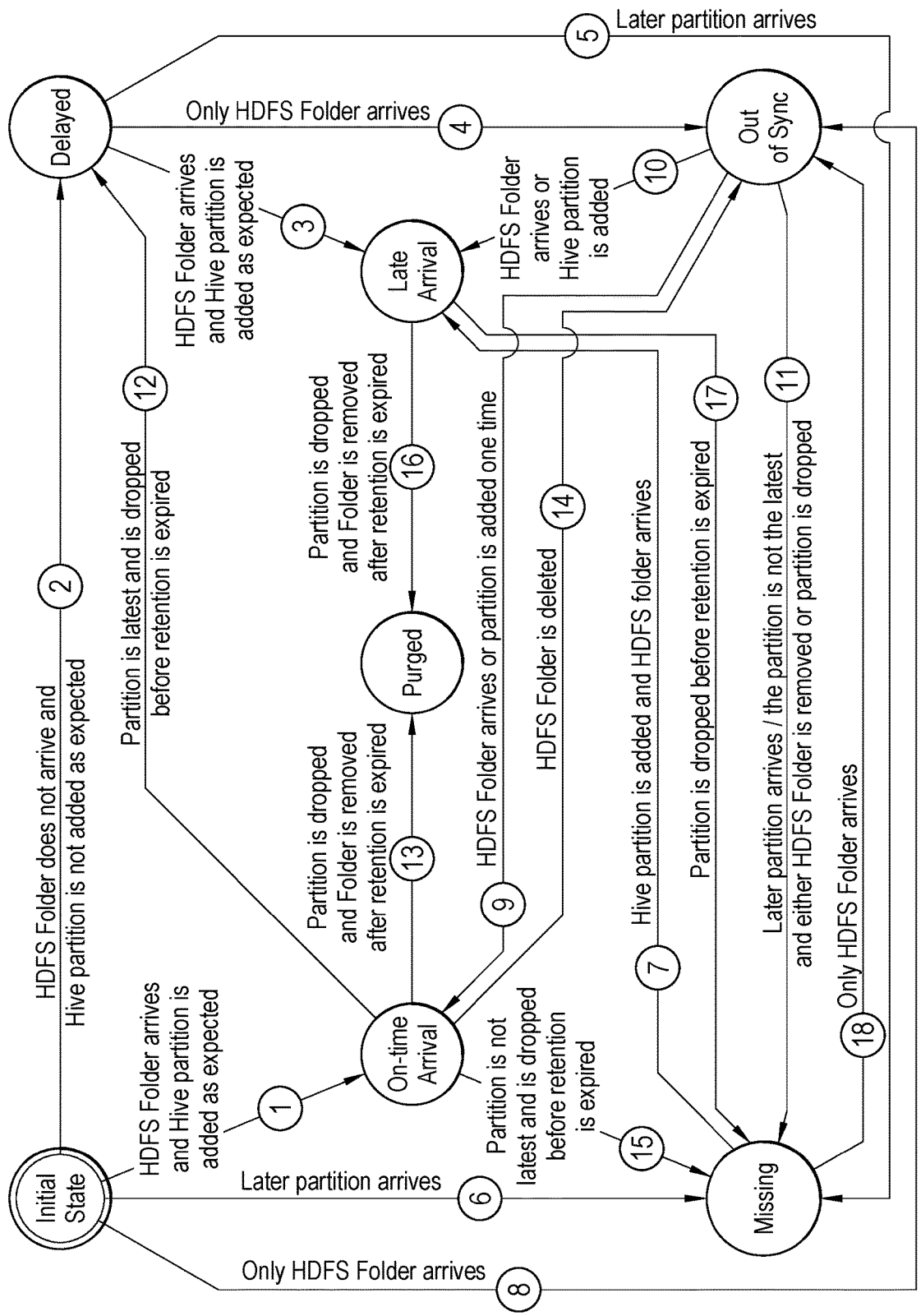
FIG. 5 is a state diagram for a data set in accordance with some embodiments of the present disclosure.
Figure 6:
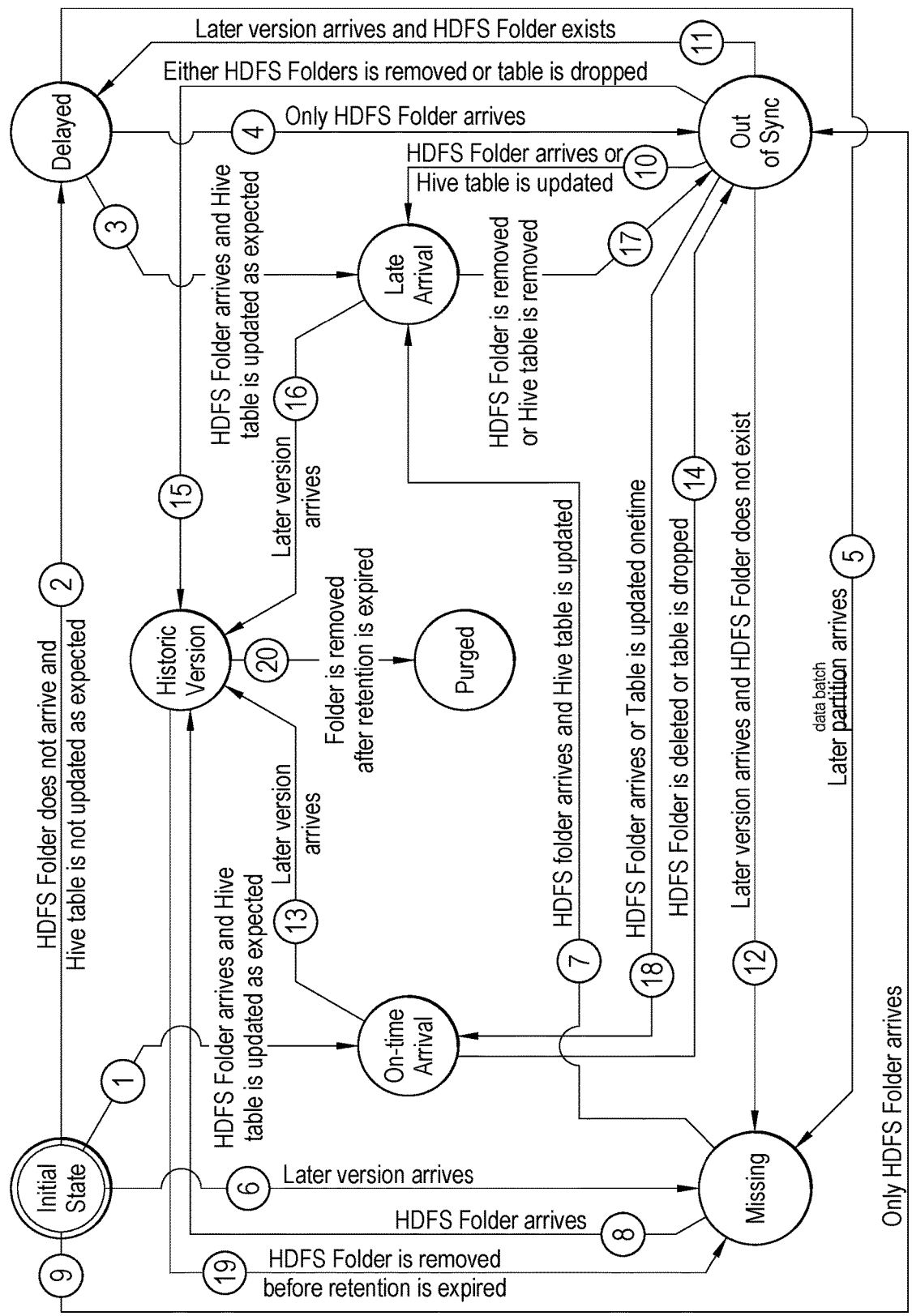
FIG. 6 is a state diagram for a data batch in accordance with some embodiments of the present disclosure.

FIG. 4A and FIG. 4B are a flow diagram of an example method 400 to utilize the state diagram to maintain and illustrate the current status of a data set and/or data batch characteristic. For this illustration, the data set characteristic is on-time arrival. FIG. 5 and FIG. 6 illustrate exemplary corresponding state diagrams. Although this illustration is focused on time of status, one of skill in the art would understand that a similar process may be used to maintain a state representing other characteristics. Other characteristics that can be monitored using a state diagram include, but not limited to data freshness, number of partitions, number of versions in a given time window, etc.

At operation 402, the current state of the data set is maintained in the state diagram. In one embodiment, the current state is stored once it is calculated, and maintained in that way. In one embodiment, for some data sets new data batches arrive once per day. Therefore, this process is run once per day when the new data batch is expected/received. The new data set has unknown characteristics.

At operation 404, a new data batch is expected. In one embodiment, a data set has a defined schedule, at what time new data batches are expected. It is possible that there may be data sets for which data batches that are not regularly scheduled. For such data sets, a different state diagram would be constructed.

At operation 406, the method 400 determines whether the complete data batch was received. A complete data batch, in one embodiment, includes a folder and partition, enabling the data batch to be added to the repository. The folder is the storage location/address of the data in the data repository. The partition is the metadata describing the contents of the folder. A partition may be zero if the folder is empty, e.g., no data is stored in the folder, or if the meta data was not acquired. If the complete data batch was not received, the method 400 continues to the portion of the method illustrated in FIG. 4B. This path will be discussed below.

If the complete data batch was received, at operation 408, the method determines whether the data batch arrived on time. On-time arrival indicates that the data batch arrived at or prior to the time when it was expected, in accordance with the data validation assertion. If the data batch arrived on time, the data batch state is updated to on-time arrival, at operation 410. The data set state is also updated to on-time arrival, at operation 412.

If the complete data batch was not received on time, it was received late. When the data batch did not arrive on time, as determined at operation 408, the data batch state is set to late arrival, at operation 414. Late arrival indicates that the data batch arrived after the time it was expected. Late arrival is considered a negative state. In one embodiment, a late data batch state may result in an alert being sent. At operation 416, the data set state is also updated to late arrival.

At operation 418, the method determines whether the prior data batch remains available. In one embodiment, the system maintains not just a current data batch but prior data batches, at least for some time. Thus, when the immediately prior data batch is not available, this is indicated in the data set status.

If the immediate prior data batch is not available, at operation 420, the data set state is set to missing. Missing is considered a negative state. This indicates that while the data is current, a prior data set is not available. If the immediate prior data batch is available, the status of that data batch is updated, at operation 422. The status of that prior data batch is updated to "historic version," indicating that the data batch is no longer current, but remains available for use.

Returning to operation 406, if the complete data batch was not successfully received, the method continues to operation 430, in FIG. 4B.

At operation 430, the method determines whether an incomplete data batch was received. An incomplete data batch in one embodiment, is not usable, because it is missing a portion of the data set. In one embodiment, for a Hadoop repository a complete data batch includes an HDFS (Apache® Hadoop® Distributed File System) folder and an Apache Hive™ partition. For a different data repository system, alternative structures may be used. Thus, the system determines whether all portions of the data batch required for the particular storage structure have been received.

If no data batch was received, the data batch state is set to delayed, at operation 432. Delayed is considered a negative state. The data batch remains in the delayed state until either the data batch is received late, or a subsequent data batch is received. At operation 434, the data set state is updated to delayed as well. In one embodiment, this may trigger an alert, indicating that an expected data batch was not timely received.

If an incomplete data batch is received, at operation 436, the data batch state is set to out of sync. Out of sync indicates that that a portion of the data batch wasn't successfully received. Out of sync is considered a negative state. In some embodiments, an alert may be returned to the third party data provider, when this state is reached. In one embodiment, the system can shift from out of sync, if the remainder of the data batch is received.

At operation 438 the data set state is updated.

As noted above, the method 400 monitors the data repository, detects a new data batch, utilizes the state diagram to determine the status of the data batch, and applies the other data validation assertions, in one embodiment. In another embodiment, the data repository can notify the data health reasoner that new data has been received, which can trigger the data health reasoner to apply the data validation assertions to the new data. In one embodiment, the data validation assertions can be applied during a processing period before the data batch is made available to users. In another embodiment, the assertions can be applied as the data streams are received into the repository. In one embodiment, the data batch is in the data repository and available immediately, even before the data validation assertions are applied.

The methods described above can be performed by processing logic that can include hardware (e.g., processing device, circuitry, dedicated logic, programmable logic, microcode, hardware of a device, integrated circuit, etc.), software (e.g., instructions run or executed on a processing device), or a combination thereof. In some embodiments, one or more of the methods above are performed by the data health reasoner component 150 and/or the state diagram logic 170 of FIG. 1. Although shown in a particular sequence or order, unless otherwise specified, the order of the processes can be modified. Thus, the illustrated embodiments should be understood only as examples, and the illustrated processes can be performed in a different order, and some processes can be performed in parallel. Additionally, one or more processes can be omitted in various embodiments. Thus, not all processes are required in every embodiment. Other process flows are possible.

FIG. 5 is a state diagram for a data set in accordance with some embodiments of the present disclosure. This state diagram is for an Apache™ Hadoop® repository's on-time arrival state diagram. This is a specific implementation, based on the specifics of one embodiment of the system. Modifications to address different data repository configurations, for example, may be made without departing from the scope of the description. The initial state is the state before any data has been received.

When the HDFS folder and Apache Hive™ partition are received as expected (path 1), the state moves to "on-time arrival." This state is maintained for the data state until the next data batch is expected.

If the folder does not arrive, and the partition is not added as expected (path 2), the state moves to "delayed." The delayed state is a temporary state, that is not expected to last until the next data batch is expected. If the folder and partition are added as expected, after the data set is in the delayed state (path 3), the data set moves to a late arrival state. A late arrival state indicates that the data batch is available for use, but arrived after the expected time. The state diagram would remain in the late arrival state until the next data batch is expected.

Once in the delayed state, if the folder arrives, but the partition does not (path 4) the state moves to the out of sync state. In the out of sync state the data is not useable, because while the folder is present the data needed for the folder is not present. The data set remains in this out-of-sync state until the Hive partition arrives, at which time it moves to the late arrival stage (path 10). Alternatively, if a folder and partition timely arrive, the data set moves to the on-time arrival state (path 9). Alternatively, if the partition does not arrive, if a subsequent partition arrives, or the folder is removed, the state diagram moves to the missing state (path 11). This indicates that there is at least one data batch that is not expired but is missing from the data set.

If the state diagram is in the delayed state, and a later partition arrives, the state moves to the missing state (path 5). From this missing state, if partition is added and the folder arrives, the state diagram moves to the late arrival state (path 7).

From the initial state, in addition to on-time arrival or delayed, the system may directly move to the out-of-sync state (path 8) if only the folder arrives without the associated partition, or to the missing state (path 6) if a later partition arrives with a missing intervening data batch or partition.

From the on-time arrival state, if the partition is dropped before the retention is expired, the state moves to the delayed state (path 12). This may occur if another process deletes the data batch, for example. From the on-time arrival state or the late arrival state, if the partition is dropped and the folder removed after retention is expired, it moves to the purged state (path 13 and path 16).

If the partition is not the latest and is dropped before the retention is expired, the state moves to the missing state (path 15). If the current folder is deleted when in the on-time arrival state, the system moves to the out of sync state (path 14), indicating that the data is no longer properly in place. This should not occur, and indicates a problem in the system. From the late arrival state, if the partition is dropped before the retention period is expired, the state moves to the missing state (path 17). If subsequently only a folder arrives, the state moves to out of sync (path 18). In one embodiment, the missing, delayed, late arrival, and out-of sync states are considered negative states. A negative state may trigger an alert, depending on the data validation settings, as discussed above. On-time arrival and purged are considered positive states, indicating that the data batch was received as expected. In this way, the system maintains a data set state, which enables the determination of the status of the data batch and an accurate representation of the availability and status of the data in the data set. In some embodiments, the system may present the data set state diagram as a visual representation. In one embodiment, the visual representation may include context, providing information about the past states of the data set. In one embodiment, the visual representation may show the evolution of the data set state over time, showing each of the states, and the paths traveled by the data set state.

FIG. 6 is a state diagram for a data batch in accordance with some embodiments of the present disclosure. This state diagram is for the on-time arrival state diagram for a single data batch, or instance of the data set. This is a specific implementation, based on the specifics of one embodiment of the system. Modifications to address different data repository configurations, for example, may be made without departing from the scope of the description. The initial state is the state before any data has been received.

When the HDFS folder and Hive table are received as expected (path 1), the state moves to "on-time arrival." This state is maintained until a later version arrives, at which point the data batch's status changes to historic version (path 13).

If the folder does not arrive, and the table is not updated as expected (path 2), the state moves to "delayed." If the folder arrives and the table is updated as expected, after the data set is in the delayed state (path 3), the data set moves to a late arrival state. A late arrival state indicates that the data batch is available for use, but arrived after the expected time. The data batch would remain in the late arrival state until the next data batch arrives, at which point the data batch state moves to the historic version state (path 16).

When the data batch is in the delayed state, and only the folder arrives (path 4) the state moves to the out of sync state. In the out of sync state the data is not useable, because while the folder is present the data needed is not present. The data set remains in this out-of-sync state until the hive table is updated, at which time it moves to the late arrival stage (path 10). If a later version of the data arrives, and the folder does not exist, the state diagram moves to the missing state (path 12).

If the state diagram is in the delayed state, and a later version arrives, the state moves to the missing state (path 5). From this missing state, if partition is added and the table is updated, the state diagram moves to the late arrival state (path 7).

From the initial state, in addition to on-time arrival or delayed, the system may directly move to the out-of-sync state (path 8) if only the folder arrives, or to the missing state (path 6) if a later version arrives, so a data batch is missing.

From the on-time arrival state or the late arrival state, if the folder is deleted or table is dropped removed before the next version arrives, the state diagram moves to the out of sync state (path 14 and path 17). This should not occur, and indicates a problem in the system.

When the data batch is out of sync, and the folder arrives or the table is updated on-time (path 18) the state moves to the on-time arrival state. This occurs if the problem is fixed before the expected time of arrival for the data batch. Otherwise, the state would move to the late arrival state.

After the data batch has been replaced with a newer data batch, the data batch moves to the historic version (path 13, path 16). From the historic version, the data batch may be purged, when the folder is removed after retention is expired (path 20). In some cases, a data batch that is a historic version can move to the missing state, if the folder is removed before retention is expired (path 19).

Delayed, missing, out-of-sync, and late arrival are considered negative states that may trigger alerts. On-time arrival, historic version, and purged are considered positive states, which indicate that the system is functioning as expected. In this way, the system maintains a data batch state, which enables the determination of the status of the data batch and an accurate representation of the availability and status of this particular data batch. In some embodiments, the system may present the data batch state diagram as a visual representation. In one embodiment, the visual representation may include context, providing information about the past states of the data batch. In one embodiment, the visual representation may show the evolution of the data batch state over time, showing each of the states, and the paths traveled by the data batch state.

The state diagrams of FIG. 5 and FIG. 6 may be made available to users as a user interface. This enables a visual representation of the state of the data set and/or data batch.

Figure 7:
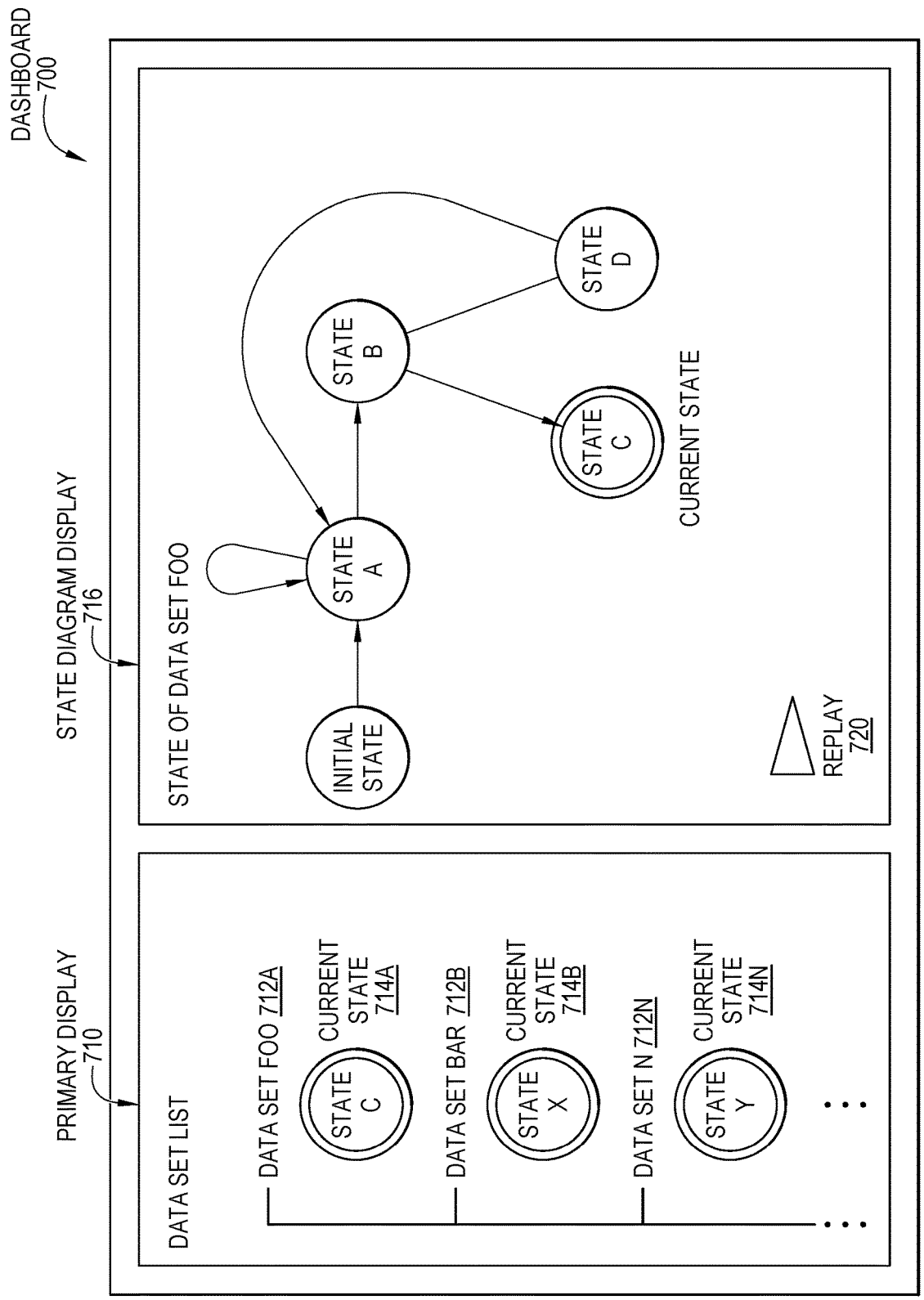
FIG. 7 is a visual representation of one embodiment of a plurality of data set states.

FIG. 7 is a visual representation of one embodiment of a dashboard 700 that allows a user to see the states of a plurality of data sets, and a plurality of data set states. As can be seen, the primary display 710 shows the status of a plurality of data sets 712. In one embodiment, the user may select the status of the data sets to be displayed. In one embodiment, this display may be based on the data sets used by the application. For each of the plurality of data sets, the user can immediately see the current state 714.

In one embodiment, the dashboard 700 permits the selection of a particular data set enable viewing of the state diagram display 716 which provides the context, e.g., how the data set arrived at this state. In one embodiment, the system displays the state diagram, or relevant portion of the state diagram. The user may select the "replay" option 720, which illustrates the sequence of states that the data went through, to arrive at the current state. This provides one embodiment of a visual interface for the system, and context for the current state.

The state diagrams above can be implemented by processing logic that can include hardware (e.g., processing device, circuitry, dedicated logic, programmable logic, microcode, hardware of a device, integrated circuit, etc.), software (e.g., instructions run or executed on a processing device), or a combination thereof. In some embodiments, one or more of the processes to maintain and/or display the state diagrams are performed by the state diagram logic 170 and/or the data health reasoner component 150 of FIG. 1. The illustrated embodiments should be understood only as examples, and the illustrated state diagrams can be altered based on the repository format, and other conditions. Additionally, one or more states can be omitted in various embodiments. Thus, not all states are required in every embodiment. Other state diagrams are possible.

Figure 8:
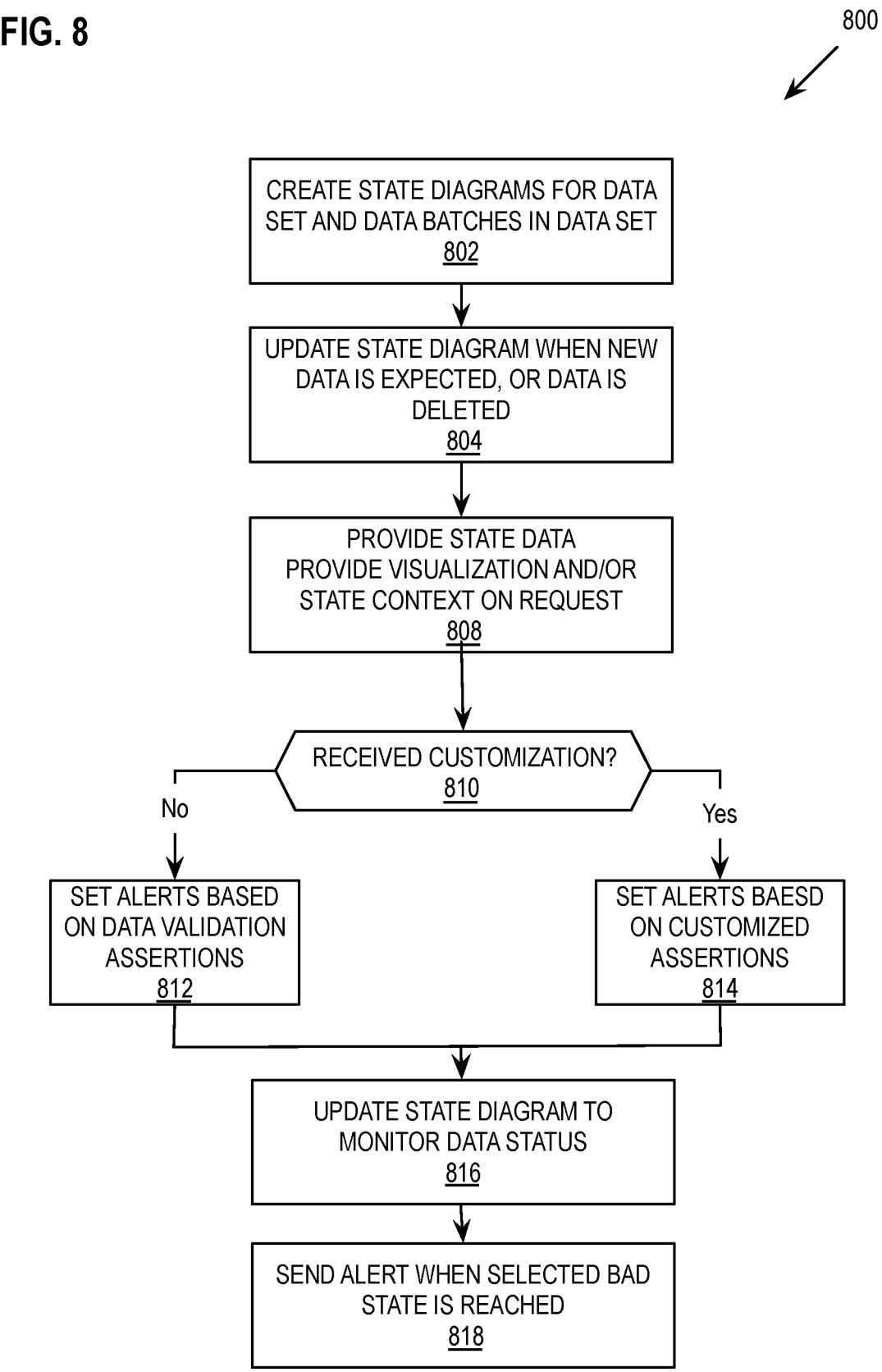
FIG. 8 is a flow diagram of an example method 800 to provide customized data health reasoning in accordance with some embodiments of the present disclosure.

FIG. 8 is a flow diagram of an example method 800 to provide data health reasoning in accordance with some embodiments of the present disclosure. At operation 802, state diagrams are created for the data set. In some embodiments, separate state diagrams are created for one or more of the characteristics of the data set that are tracked by the system. In one embodiment, state diagrams are created for data batches when they are received.

At operation 804, the state diagram is updated when new data is expected, or data is deleted. As described above, the state diagram for the data set is updated. In one embodiment, a state diagram is created for the new data batch, and the state diagram for prior data batches is updated.

At operation 808, state data is provided. The state data may be a data set state data and/or data batch state data. In one embodiment, a visualization of the data state is provided. In one embodiment, visualization is provided on request. In one embodiment, the visualization can provide status of one or more data sets. In one embodiment, the visualization can include data sets selected by a user, and provide a status indicator for each of the data sets selected. The status indicator can indicate whether each data set is currently meeting its data validation assertions. The visualization may also include displaying the state diagram for the characteristic. In another embodiment, the visualization may include showing an indicator of the current state in the state diagram for the characteristic of the data set. In one embodiment, the visual user interface may represent multiple characteristics of the data set. In one embodiment, the visual user interface may represent the status of multiple data sets. In one embodiment, the visualization may provide state context, indicating past states for the data batch and/or data set. In one embodiment, the visualization may allow a user to see the past states of the data set/batch. In one embodiment, the past states may be shown using a state diagram, with the state highlighted when entered, and a path highlighted when the state changes.

At operation 810, the method 800 determines whether a customization has been received for one or more of the data validation assertions. If no customization was received, at operation 812, the alerts are set based on the baseline data validation assertions. If customizations have been received, then at operation 814 alerts are set based on the customized assertions. For example, if the user sets an alarm for a data set not available at time X, the system determines at time X whether the state for the data set is a state indicating that the data is available (e.g., on-time arrival or late arrival), or unavailable (e.g., delayed, out of sync, or missing.)

At operation 816, the state diagram is updated to monitor the status of the data set. At operation 818, alerts are sent when one or more assertions are not met by the data set, after a new data batch is received. The visualization is also updated based on the state diagram and data validation assertions. In one embodiment, the system provides two types of notice to data consumers, the visualization of the data state diagram and individual alerts. In one embodiment, the individual alerts can be sent via a dashboard, email, text, or in another format.

The methods described above can be performed by processing logic that can include hardware (e.g., processing device, circuitry, dedicated logic, programmable logic, microcode, hardware of a device, integrated circuit, etc.), software (e.g., instructions run or executed on a processing device), or a combination thereof. In some embodiments, one or more of the methods above are performed by the data health reasoner component 150 and/or the state diagram logic 170 of FIG. 1. Although shown in a particular sequence or order, unless otherwise specified, the order of the processes can be modified. Thus, the illustrated embodiments should be understood only as examples, and the illustrated processes can be performed in a different order, and some processes can be performed in parallel. Additionally, one or more processes can be omitted in various embodiments. Thus, not all processes are required in every embodiment. Other process flows are possible.

FIG. 9 illustrates an example machine of a computer system 900 within which a set of instructions, for causing the machine to perform any one or more of the methodologies discussed herein, can be executed. In some embodiments, the computer system 900 can correspond to a component of a networked computer system (e.g., the computer system 100 of FIG. 1) that includes, is coupled to, or utilizes a machine to execute an operating system to perform operations corresponding to the data health reasoner 150 and state diagram logic 170 of FIG. 1.

Data health reasoner 150, data health assertion repository 160, and state diagram logic 170 are shown as part of instructions 912 to illustrate that at times, portions of data health reasoner 150 and/or data health assertion repository 160 and/or state diagram logic 170 are executed by processing device 902. However, it is not required that data health reasoner 150 and/data health assertion repository 160 and/or state diagram logic 170 be included in instructions 912 at the same time and any portions of data health reasoner 150 and/or data health repository 160 are stored in other components of computer system 900 at other times, e.g., when not executed by processing device 902.

The machine can be connected (e.g., networked) to other machines in a local area network (LAN), an intranet, an extranet, and/or the Internet. The machine can operate in the capacity of a server or a client machine in a client-server network environment, as a peer machine in a peer-to-peer (or distributed) network environment, or as a server or a client machine in a cloud computing infrastructure or environment.

The machine can be a personal computer (PC), a smart phone, a tablet PC, a set-top box (STB), a Personal Digital Assistant (PDA), a cellular telephone, a web appliance, a server, or any machine capable of executing a set of instructions (sequential or otherwise) that specify actions to be taken by that machine. Further, while a single machine is illustrated, the term "machine" shall also be taken to include any collection of machines that individually or jointly execute a set (or multiple sets) of instructions to perform any one or more of the methodologies discussed herein.

The example computer system 900 includes a processing device 902, a main memory 904 (e.g., read-only memory (ROM), flash memory, dynamic random access memory (DRAM) such as synchronous DRAM (SDRAM) or Rambus DRAM (RDRAM), etc.), a memory 906 (e.g., flash memory, static random access memory (SRAM), etc.), an input/output system 910, and a data storage system 940, which communicate with each other via a bus 930.

Data health reasoner 150, data health assertion repository 160, and state diagram logic 170 are shown as part of instructions 914 to illustrate that at times, portions of data health reasoner 150 and/or data health assertion repository 160 and/or state diagram logic 170 can be stored in main memory 904. However, it is not required that data health reasoner 150 and/or data health repository 160 be included in instructions 914 at the same time and any portions of data health reasoner 150 and/or data health repository 160 can be stored in other components of computer system 900.

Processing device 902 represents one or more general-purpose processing devices such as a microprocessor, a central processing unit, or the like. More particularly, the processing device can be a complex instruction set computing (CISC) microprocessor, reduced instruction set computing (RISC) microprocessor, very long instruction word (VLIW) microprocessor, or a processor implementing other instruction sets, or processors implementing a combination of instruction sets. Processing device 902 can also be one or more special-purpose processing devices such as an application specific integrated circuit (ASIC), a field programmable gate array (FPGA), a digital signal processor (DSP), network processor, or the like. The processing device 902 is configured to execute instructions 912 for performing the operations and steps discussed herein.

The computer system 900 can further include a network interface device 908 to communicate over the network 920. Network interface device 908 can provide a two-way data communication coupling to a network. For example, network interface device 908 can be an integrated-services digital network (ISDN) card, cable modem, satellite modem, or a modem to provide a data communication connection to a corresponding type of telephone line. As another example, network interface device 908 can be a local area network (LAN) card to provide a data communication connection to a compatible LAN. Wireless links can also be implemented. In any such implementation, network interface device 908 can send and receives electrical, electromagnetic, or optical signals that carry digital data streams representing various types of information.

The network link can provide data communication through at least one network to other data devices. For example, a network link can provide a connection to the world-wide packet data communication network commonly referred to as the "Internet," for example through a local network to a host computer or to data equipment operated by an Internet Service Provider (ISP). Local networks and the Internet use electrical, electromagnetic, or optical signals that carry digital data to and from computer system 900.

Computer system 900 can send messages and receive data, including program code, through the network(s) and network interface device 908. In the Internet example, a server can transmit a requested code for an application program through the Internet and network interface device 908. The received code can be executed by processing device 902 as it is received, and/or stored in data storage system 940, or other non-volatile storage for later execution.

Data health reasoner 150, data health assertion repository 160, and state diagram logic 170 are shown as part of instructions 944 to illustrate that at times, portions of data health reasoner 150 and/or data health assertion repository 160 and/or state diagram logic 170 can be stored in data storage system 940. However, it is not required that data health reasoner 150 and/or data health assertion repository 160 and/or state diagram logic 170 be included in instructions 944 at the same time and any portions of data health reasoner 150 and/or data health assertion repository 160, and state diagram logic 170 can be stored in other components of computer system 900.

The input/output system 910 can include an output device, such as a display, for example a liquid crystal display (LCD) or a touchscreen display, for displaying information to a computer user, or a speaker, a haptic device, or another form of output device. The input/output system 910 can include an input device, for example, alphanumeric keys and other keys configured for communicating information and command selections to processing device 902. An input device can, alternatively or in addition, include a cursor control, such as a mouse, a trackball, or cursor direction keys for communicating direction information and command selections to processing device 902 and for controlling cursor movement on a display. An input device can, alternatively or in addition, include a microphone, a sensor, or an array of sensors, for communicating sensed information to processing device 902. Sensed information can include voice commands, audio signals, geographic location information, and/or digital imagery, for example.

The data storage system 940 can include a machine-readable storage medium 942 (also known as a computer-readable medium) on which is stored one or more sets of instructions 944 or software embodying any one or more of the methodologies or functions described herein. The instructions 912, 914, 944 can also reside, completely or at least partially, within the main memory 904 and/or within the processing device 902 during execution thereof by the computer system 900, the main memory 904 and the processing device 902 also constituting machine-readable storage media.

In one embodiment, the instructions 926 include instructions to implement functionality corresponding to data health reasoner (e.g., the data health reasoning component 150 of FIG. 1) and state diagram logic (e.g., the state diagram logic 170 of FIG. 1). While the machine-readable storage medium 942 is shown in an example embodiment to be a single medium, the term "machine-readable storage medium" should be taken to include a single medium or multiple media that store the one or more sets of instructions. The term "machine-readable storage medium" shall also be taken to include any medium that is capable of storing or encoding a set of instructions for execution by the machine and that cause the machine to perform any one or more of the methodologies of the present disclosure. The term "machine-readable storage medium" shall accordingly be taken to include, but not be limited to, solid-state memories, optical media, and magnetic media.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. The present disclosure can refer to the action and processes of a computer system, or similar electronic computing device, that manipulates and transforms data represented as physical (electronic) quantities within the computer system's registers and memories into other data similarly represented as physical quantities within the computer system memories or registers or other such information storage systems.

The present disclosure also relates to an apparatus for performing the operations herein. This apparatus can be specially constructed for the intended purposes, or it can include a general-purpose computer selectively activated or reconfigured by a computer program stored in the computer. For example, a computer system or other data processing system, such as the computing system 100, can carry out the computer-implemented method of generating data validation assertions and verifying that data batches meet these data validation assertions, in response to its processor executing a computer program (e.g., a sequence of instructions) contained in a memory or other non-transitory machine-readable storage medium. Such a computer program can be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

The algorithms and displays presented herein are not inherently related to any particular computer or other apparatus. Various general-purpose systems can be used with programs in accordance with the teachings herein, or it can prove convenient to construct a more specialized apparatus to perform the method. The structure for a variety of these systems will appear as set forth in the description below. In addition, the present disclosure is not described with reference to any particular programming language. It will be appreciated that a variety of programming languages can be used to implement the teachings of the disclosure as described herein.

The present disclosure can be provided as a computer program product, or software, that can include a machine-readable medium having stored thereon instructions, which can be used to program a computer system (or other electronic devices) to perform a process according to the present disclosure. A machine-readable medium includes any mechanism for storing information in a form readable by a machine (e.g., a computer). In some embodiments, a machine-readable (e.g., computer-readable) medium includes a machine (e.g., a computer) readable storage medium such as a read only memory ("ROM"), random access memory ("RAM"), magnetic disk storage media, optical storage media, flash memory components, etc.

In the foregoing specification, embodiments of the disclosure have been described with reference to specific example embodiments thereof. It will be evident that various modifications can be made thereto without departing from the broader spirit and scope of embodiments of the disclosure as set forth in the following claims. The specification and drawings are, accordingly, to be regarded in an illustrative sense rather than a restrictive sense.

What is claimed is:

1. A method comprising:
   maintaining a data pool including a plurality of heterogeneous data sets;
   receiving a first data batch of a data set from a data source into the data pool;
   determining a current state of the data set based on a data set state diagram including a plurality of data set states;
   identifying a condition of the first data batch;
   setting a data batch state for the first data batch, based on a data batch state diagram; and
   updating the data batch state of a prior data batch received before the first data batch, based on the condition of the first data batch and the data batch state diagram of the prior data batch;
   transitioning the data set state diagram, based on the condition of the first data batch, to an updated data set state;
   maintaining a data state repository storing the data set state for each of the plurality of heterogeneous data sets; and
      in response to a query for a status of a data set in the data pool, responding with the status using the data state diagram without accessing the data set.

2. The method of claim 1, wherein each of the plurality of data set states may be positive or negative, and each of the plurality of data set states is selected from among:
   the negative states including late arrival state, delayed state, missing state, and out of sync state, and the positive states including on-time arrival state and purged state.

3. The method of claim 2, further comprising:
   testing the updated data set state to determine that one of the negative states is reached, and alerting a user based upon a result of the testing.

4. The method of claim 2, wherein the plurality of data set states are:
   the on-time arrival state indicating that a most recent data batch was timely received;
   the delayed state indicating that the most recent data batch was not received at an expected time;
   the late arrival state indicating that-that the most recent data batch was received after the expected time;
   the out of sync state indicating that a portion of the most recent data batch is missing; and
   the missing state indicating that a past version of all of the data batch is missing, but that the missing data batch is not a most recent data batch.

5. The method of claim 1, further comprising:
   providing context to the data set state, the context indicating one or more prior states for the data set.

6. The method of claim 1, further comprising:
   enabling replay of changes in the data set state diagram over time, the replay providing a visual representation of changes in the data set state over time.

7. The method of claim 1, further comprising:
   enabling a user to query the data state repository for the status of a data set, wherein determining a response to the query does not require access to the data set.

8. The method of claim 1, further comprising:
   providing a dashboard showing the status of a plurality of data sets.

9. The method of claim 1, further comprising:
   receiving a user alert instruction;
   identifying a relevant data set state associated with the alert instruction;
   determining that a current data set state is the relevant data set state for alerting; and
   sending the alert based on the determining that the current data set state is the relevant data set state for the alerting.

10. A system comprising:
    a memory configured to store a plurality of heterogeneous data sets;
    a network connection configured to receive a first data batch of a first data set from a data source into the memory;
    a processor configured to:
       determining a current state of the data set based on a data set state diagram including a plurality of data set states;
       identify a condition of the first data batch;
       set a data batch state for the first data batch, based on a data batch state diagram;
       update the data batch state of a prior data batch, based on the condition of the first data batch and the data batch state diagram of the prior data batch;
       update the data set state diagram, based on the condition of the first data batch; and
    a data state repository configured to store the data set state for each of the plurality of heterogeneous data set; and
    the processor further configured to respond to a user query for a status of a data set in the memory with the status using the data state diagram without accessing the memory.

11. The system of claim 10, wherein the plurality of data set states include: an on-time arrival state, a late arrival state, a delayed state, a missing state, and an out of sync state.

12. The system of claim 11, wherein the plurality of data set states are:
    the on-time arrival state indicating that a most recent data batch was timely received;
    the delayed state indicating that the most recent data batch was not received at an expected time;
    the late arrival state indicating that the most recent data batch was received after the expected time;
    the out of sync state indicating that a portion of the data batch is missing; and the missing state indicating that a past version of all of the data batch is missing, but that the missing data batch is not a most recent data batch.

13. The system of claim 10, further comprising:
the processor further configured to test the updated data set state to determine a negative state is reached, and alert a user based upon a result of the testing.

14. The system of claim 10, further comprising:
a user interface configured to provide a current data set state to a user, and further to provide context to the current data set state, the context indicating one or more prior states for the data set.

15. The system of claim 14, further comprising:
the user interface further configured to enable replay of changes in the data set state diagram over time, the replay providing a visual representation of changes in the data set state over time.

16. The system of claim 15, further comprising:
the user interface configured to receive a user query for the data state repository for a status of a data set, wherein determining a response to the user query does not require access to the data set.

17. The system of claim 15, further comprising:
the user interface configured to provide a dashboard showing a status of a plurality of data sets.

18. The system of claim 10, further comprising:
a user interface configured to allow a user to set up a user alert instruction;
the processor further configured to identify one or more data set states for alerting based on the user alert instruction and determine when the state diagram is in one of the data set states for alerting; and
the user interface configured to send the alert when the state diagram is in one of the data set states for alerting.

19. A system comprising:
a storage means configured to store a plurality of heterogeneous data sets;
an interface means configured to receive a first data batch of a first data set from a data source into the storage means;
a processing means configured to:
determining a current state of the data set based on a data set state diagram including a plurality of data set states;
identify a condition of the first data batch;
set a data batch state for the first data batch, based on a data batch state diagram;
update the data batch state of a prior data batch, based on the condition of the first data batch and the data batch state diagram of the prior data batch;
update the data set state diagram, based on the condition of the first data batch;
a data state repository configured to store the data set state for each of the plurality of heterogeneous data sets; and
the processing means further configured to respond to a user query for a status of a data set in the storage means with the status using the data state diagram without accessing the storage means.

20. The system of claim 19, further comprising:
the processing means to providing context to the data set state, the context indicating one or more prior states for the data set, and enabling replay of changes in the data set state diagram over time, the replay providing a visual representation of changes in the data set state over time.

* * * * *